July 19, 1927.

J. E. SEARS, JR., ET AL 1,636,533

MAGNETIC CHUCK.

Original Filed Nov. 22, 1919    3 Sheets-Sheet 1

Inventors
J. E. Sears, Jr
A. J. C. Brookes
by
H. R. Kenslake
Atty.

Inventors
J.E.Sears.Jr
A.J.C.Brookes.
By H.R.Kerslake
Atty.

July 19, 1927. 1,636,533
J. E. SEARS, JR., ET AL
MAGNETIC CHUCK
Original Filed Nov. 22, 1919    3 Sheets-Sheet 3

Inventors
J. E. Sears, Jr
A. J. C. Brookes
By H. R. Kerslake
Atty

Patented July 19, 1927.

1,636,533

UNITED STATES PATENT OFFICE.

JOHN EDWARD SEARS, JR., AND ARTHUR JOHN CHARLES BROOKES, OF TEDDINGTON, MIDDLESEX, ENGLAND; SAID SEARS ASSIGNOR TO SAID BROOKES.

MAGNETIC CHUCK.

Original application filed November 22, 1919, Serial No. 339,915, and in Great Britain November 22, 1918. Divided and this application filed June 14, 1920. Serial No. 389,044.

This invention relates to chucks for use in the production of such articles as slip measuring gauges, that is, gauges of an accurate and determined thickness so that a length to be measured may be gauged in terms of the thickness of one or more of such gauge plates.

The object of the present invention is to provide an improved form of chuck by means of which such slip measuring gauges may be more accurately produced than hitherto even by the use of semiskilled labour and with this and other objects in view the invention consists in the various details and combinations of parts hereinafter described and pointed out in the appendant claims.

The accompanying drawings illustrate three modes of carrying out the invention.

Figure 1:
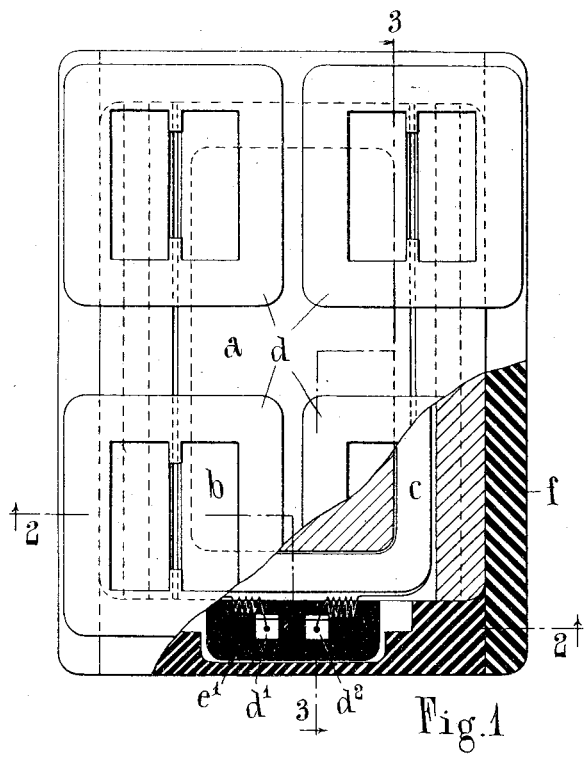
Figure 1 is a plan view with a part broken away showing one form of chuck in accordance with the invention.
Figure 2:
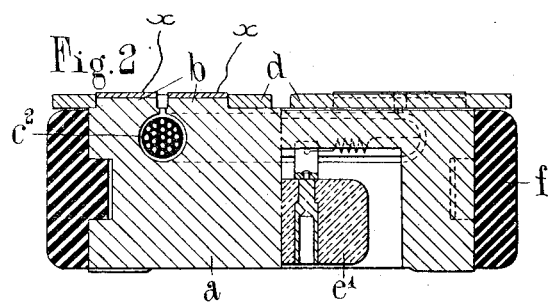
Figure 2 is a section on the line 2—2 of Figure 1.
Figure 3:
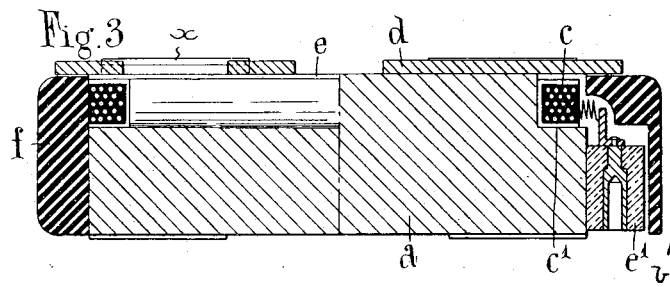
Figure 3 is a section on the line 3—3 of Figure 1.

In carrying our invention into effect in one convenient manner as illustrated in Figures 1 to 3, we form our improved lapping chuck from a solid rectangular or other suitably shaped block $a$ of metal on the upper face of which we form a plurality of platforms or facets $b$ integral with the block and projecting slightly above the general surface of the block, such platforms or facets being adapted for location of the slip gauges $x$ during the operation of lapping the same and being formed as nearly as possible coplanar.

The gauges to be lapped are first formed with one surface plain and they are then placed on the facets $b$ with their plain surfaces adjacent thereto prior to being rubbed with a lapping plate charged with or upon a more or less finely ground abrasive, such lapping operation being well understood and therefore requiring no further description.

In general it will be found that since the facets $b$ are most accurately formed, the slip gauges may be made to "wring" thereon, that is to say, when the plain surface of a gauge is pressed into contact with the plain surface of the facet the two will be made to adhere under the condition of wringing and air pressure sufficiently strong to enable the lapping operation to be conducted without displacement of the slip gauge. The positioning and holding of the gauges may however be facilitated by providing for magnetic adhesion produced, for example, by the coils $c$ or by means of a guard or guards $d$ which are so formed that they accurately surround the facets $b$ and project slightly above the upper surface thereof as clearly shewn, for example, in Figure 2, but on the other hand are slightly below the surface of the gauge plates so that such surface may be lapped without the lapping plate coming into contact with the guards. The guard plates are of course positioned by contact with the outer edges of the facets and need no further positioning devices.

As regards the magnetizing of the form of chuck shewn in Figures 1 to 3 this may be accomplished by forming the ends of the chuck with the cut-away portions $c'$ which are connected by through bores $c^2$ provided with the slots $e$ formed in the upper surface of the chuck between the facets in the manner clearly shewn in Figures 1 and 2. This arrangement permits therefore of the winding of the coil $c$, the wire forming the coil being wound in the end portions $c'$ and being passed through the slots $e$ so as to be located in the connecting bores $c^2$. When the coil has thus been completely wound its ends are connected to the terminals $d'$ $d^2$ located in the insulating block $e'$.

The whole of the outer part of the chuck is then enclosed by means of a wooden or like envelope $f$ which serves as a heat insulator and prevents the heat of the hand or body of the operator from passing to the material of the chuck.

Figure 4:
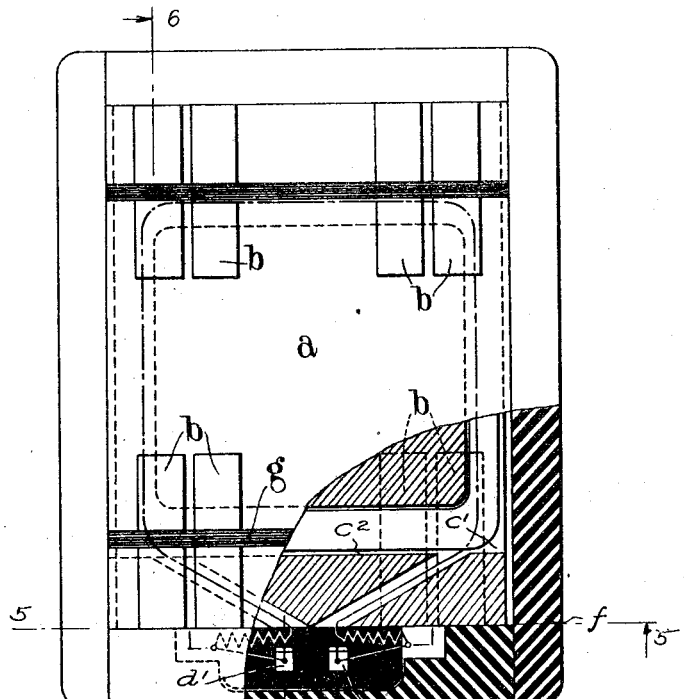
Figure 4 is a similar view to Figure 1 showing a modified form.
Figure 5:
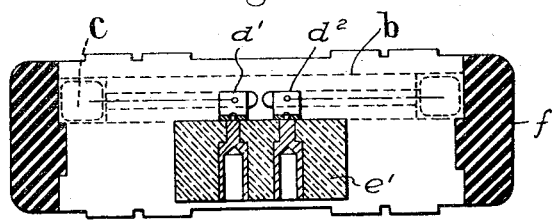
Figure 5 is a section on the line 5—5 of Figure 4.
Figure 6:
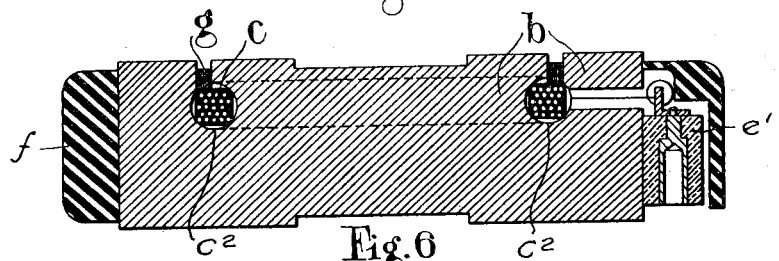
Figure 6 is a section on the line 6—6 of Figure 4.

The form of chuck shewn in Figures 4 to 6 is similar in most respects to the chuck shewn in Figures 1 to 3 and like parts in the two sets of figures are denoted by like reference letters. In this form, however, the cut-away of the chuck as at $c'$ is at the ends of the chuck instead of at the sides as in the first modification while the bores $c^2$ connecting such cut-away parts are formed transversely as shewn and the winding of the coil $c$ is facilitated by the transverse slots $g$.

As before the ends of the coil are connected with the terminals $d'$ and $d^2$ arranged in the insulating block $b'$ and a wooden or like guard $f$ again surrounds the chuck to act as a heat insulator, it being understood that in both the foregoing forms the wooden guard may be formed in sections which are secured to the chuck by screws or other fastening devices.

In the chuck shewn in Figures 4 to 6 no guard members $d$ are illustrated but it will be apparent that these may be equally well employed with this form.

Figure 7:
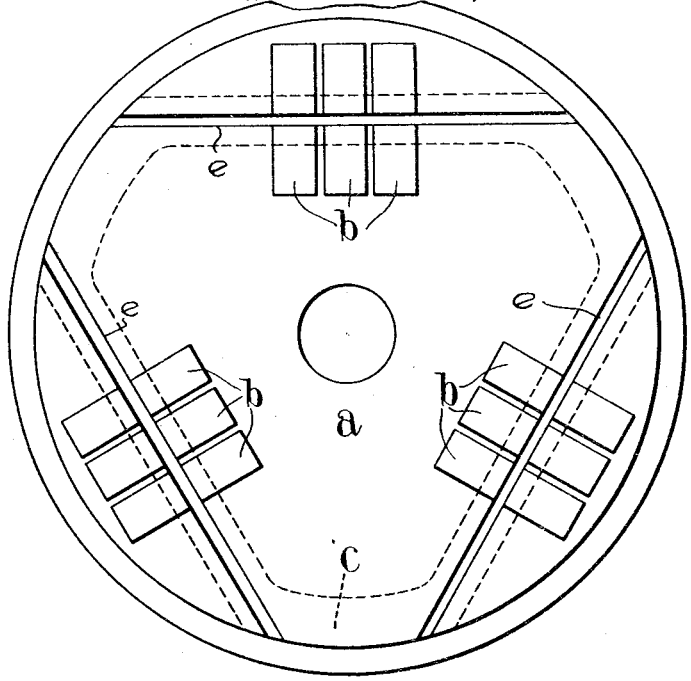
Figures 7 and 8 are respectively plan and side view of a further modification in accordance with the invention.
Figure 8:
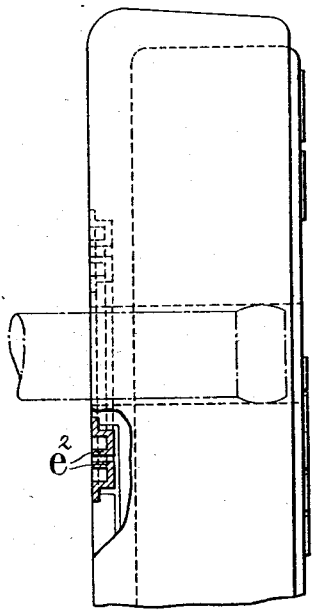

Figures 7 and 8 show a convenient chuck that may be employed for mechanical lapping, the chuck being again formed from a solid block of metal $a$ having the facets $b$ integral therewith and projecting somewhat above the surface, the chuck being wound in a similar manner to the foregoing with a coil $c$ to which current may be led from the slip rings $e^2$.

Having now described our invention what we claim as new and desire to secure by Letters Patent is:—

1. A chuck for use in the production of such articles as slip gauges comprising a solid metal block having a number of facets integral therewith and projecting somewhat above the general surface of the block, said facets being of a size and shape conforming to the size and shape of the slip gauges.

2. A chuck according to claim 1 in which the block is bored for the reception of an electromagnetic coil.

3. A chuck according to claim 1 characterized by the provision of having a heat insulating envelope arranged about the body.

4. A chuck as claimed in claim 1 characterized by the provision of guard members engaged with the body, receiving the facets and projecting slightly thereabove, whereby to confine gauges in position on the facets.

5. A lapping chuck for use in the production of parallel slip gauges comprising a solid metal block having eight facets integral therewith and projecting somewhat above the general surface of the block, said facets being in one plane and of a size and shape conforming to the size and shape of the slip gauges.

In testimony whereof we have signed our names to this specification.

JOHN EDWARD SEARS (Jun.).
ARTHUR JOHN CHARLES BROOKES.